S. D. TRENCHARD.
Ships' Log.
No. 168,432.
Patented Oct. 5, 1875.
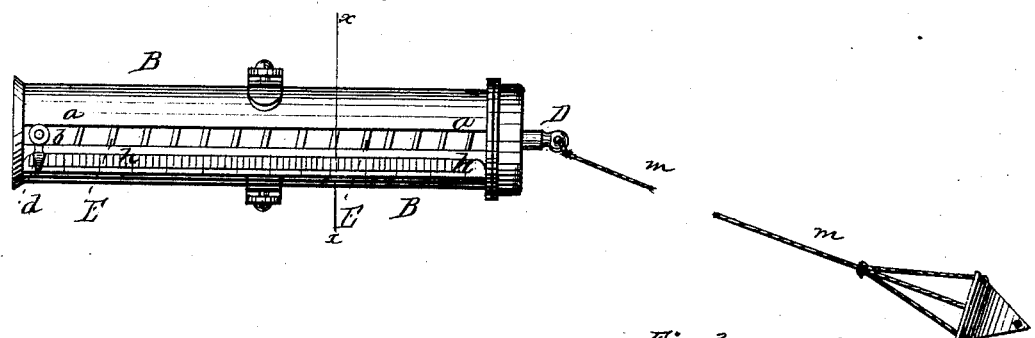
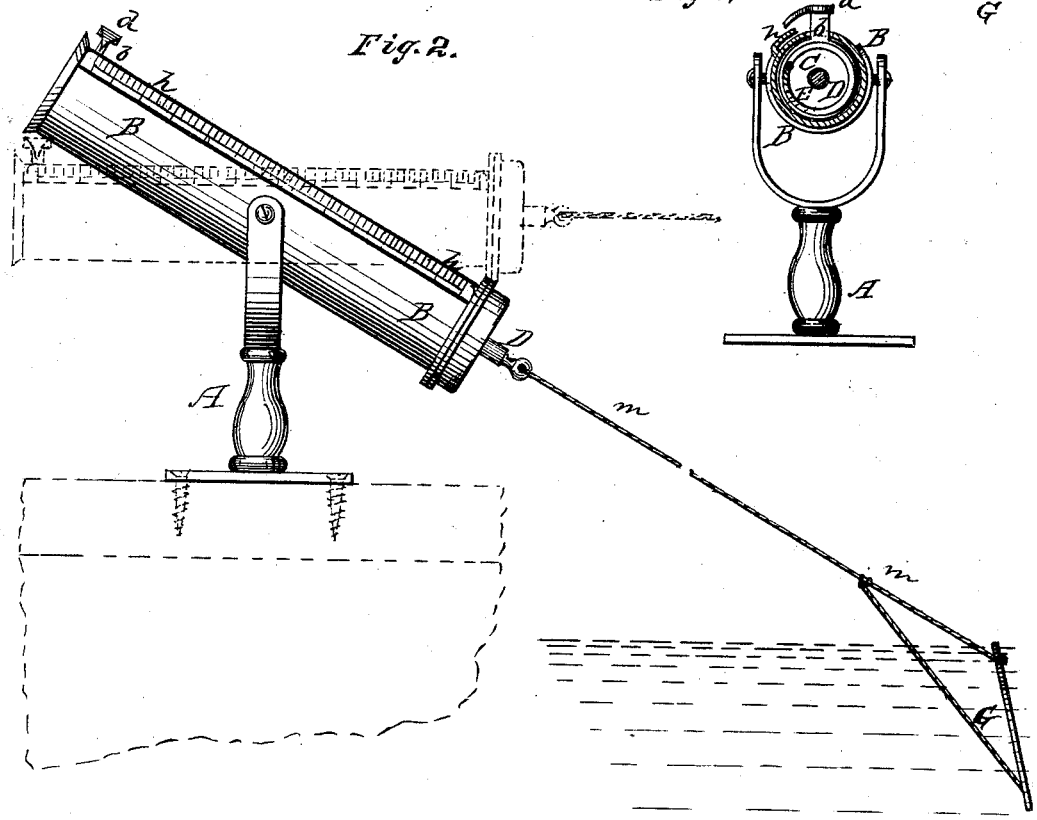
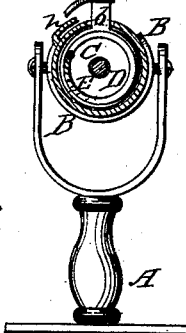
WITNESSES:
P. C. Dieterich
Wm. B. Jefferman
INVENTOR:
Stephen D. Trenchard
per: C. H. Watson & Co.
Attorneys.

UNITED STATES PATENT OFFICE.

STEPHEN D. TRENCHARD, OF NEW YORK, N. Y., ASSIGNOR TO HIMSELF AND WALTON BROTHERS, OF SAME PLACE.

IMPROVEMENT IN SHIPS' LOGS.

Specification forming part of Letters Patent No. 168,432, dated October 5, 1875; application filed August 25, 1875.

*To all whom it may concern:*

Be it known that I, STEPHEN D. TRENCHARD, of New York, in the county of New York and State of New York, have invented certain new and useful Improvements in Ships' Log; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to ships' logs, having for its object to improve the construction of the same, whereby the accurate speed of the vessel may be ascertained; and it consists in the use of an oscillating tube, combined with a spring and pointer or index, whereby the tube accommodates itself to the motion of the vessel, as will hereinafter be more fully set forth.

In the annexed drawing, Figure 1 is a plan view, Fig. 2 is a side elevation, and Fig. 3 is a cross-section, of a device embodying my invention.

A represents a stand of any suitable construction to be fastened to the gunwale or other part of the vessel. In this stand is pivoted or hung upon trunnions a cylindrical tube, B, of any suitable dimensions. This tube B is closed at both ends, and formed on top with a longitudinal slot, $a$, as shown. In the tube D is placed a disk, C, from which an arm, $b$, projects through the slot $a$, and said arm is provided with an index or finger, $d$, pointing on a graduated plate or bar, $h$, fastened on the outside of the tube B. From the center of the disk C projects a rod or stem, D, through one end of the tube, said rod or stem being within the tube surrounded by a spiral spring, E. The outer end of the rod or stem D is by a cord, $m$, divided at its outer end, connected with the three corners of a triangular plate, G. When the vessel is in motion, the plate G being thrown in the water, the index or pointer $d$ will, by the resistance of the spring E, show upon the scale $h$ the speed or velocity of the vessel, thus taking the place of the ordinary log, which is thrown overboard, and does away with the hour or minute glass.

My spring-log may be kept continually in the water for any length of time desired, and, by placing a strip of paper under the graduated bar or scale $h$, anybody can with a pencil mark the position of the index or pointer $d$, so that the officers of the vessel can afterward determine the average speed or velocity of the vessel.

Having thus fully described my invention, what I claim as new, and desire to secure by Letters Patent, is—

In a ship's log, a spring and index or pointer, in combination with the cord and plate and tube, the tube being arranged to oscillate to accommodate itself to the motion of the vessel, substantially as and for the purpose herein specified.

In testimony that I claim the foregoing as my own I affix my signature in presence of two witnesses.

STEPHEN D. TRENCHARD.

Witnesses:
 JAMES BURKE,
 JOHN P. JONES.